United States Patent
Shen

(10) Patent No.: US 9,326,125 B2
(45) Date of Patent: Apr. 26, 2016

(54) DEVICE AND METHOD FOR REALIZING IDENTITY AND LOCATOR SEPARATION NETWORK

(71) Applicant: ZTE CORPORATION, Shenzhen (CN)

(72) Inventor: Jiong Shen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 70 days.

(21) Appl. No.: 14/358,351

(22) PCT Filed: Nov. 2, 2012

(86) PCT No.: PCT/CN2012/083995
§ 371 (c)(1),
(2) Date: May 15, 2014

(87) PCT Pub. No.: WO2013/071825
PCT Pub. Date: May 23, 2013

(65) Prior Publication Data
US 2015/0023262 A1 Jan. 22, 2015

(30) Foreign Application Priority Data
Nov. 15, 2011 (CN) .......................... 2011 1 0361760

(51) Int. Cl.
*H04W 8/02* (2009.01)
*H04L 29/12* (2006.01)
*H04L 29/06* (2006.01)
*H04L 12/935* (2013.01)
*H04W 8/08* (2009.01)

(52) U.S. Cl.
CPC ............. *H04W 8/02* (2013.01); *H04L 49/3009* (2013.01); *H04L 61/103* (2013.01); *H04L 61/2084* (2013.01); *H04L 69/16* (2013.01); *H04W 8/08* (2013.01); *H04L 61/6004* (2013.01); *H04L 61/6059* (2013.01)

(58) Field of Classification Search
None
See application file for complete search history.

(56) References Cited

U.S. PATENT DOCUMENTS

| 2010/0158029 | A1 | 6/2010 | Choo et al. | |
|---|---|---|---|---|
| 2011/0093571 | A1* | 4/2011 | Gorg | H04L 29/12311 709/220 |

FOREIGN PATENT DOCUMENTS

| CN | 102006299 | 4/2011 |
|---|---|---|
| CN | 102170389 | 8/2011 |
| EP | 1032178 | 5/2005 |

OTHER PUBLICATIONS

Kang et al., "Mobility Support through Locator/ID Split Architecture," International Conference on Information Networking, Jan. 26-28, 2011; Barcelona, Spain; pp. 404-409.*
Kang et al., "Mobility Support through Locator/ID Split Architecture," International Conference on Information Networking. Jan. 26-28, 2011; 404-409. Barcelona, Spain.
Atkinson, RJ. ILNP Concept of Operations draft-rja-ilnp-intro-11. txt; Jul. 27, 2011.

* cited by examiner

*Primary Examiner* — Charles C Jiang
*Assistant Examiner* — George Atkins, Jr.
(74) *Attorney, Agent, or Firm* — Pearl Cohen Zedek Latzer Baratz LLP

(57) ABSTRACT

Provided are a system and method for realizing an identifier and locator separation network based on Internet Protocol version 6 (IPv6). The method includes that: a network prefix assigned for a terminal is taken as a part of an IPv6 address of the terminal, and a subscriber Access Identifier (AID) assigned for the terminal is also taken as a part of the IPv6 address. With the above technical solution, the additional overhead, brought by creating tunnels and removing tunnels, of the identifier and locator separation network realized based on the network can be solved.

12 Claims, 7 Drawing Sheets

DEVICE AND METHOD FOR REALIZING IDENTITY AND LOCATOR SEPARATION NETWORK

CROSS-REFERENCE TO RELATED APPLICATIONS

This application is a National Phase Application of PCT International Application No. PCT/CN2012/083995, entitled "DEVICE AND METHOD FOR REALIZING IDENTITY AND LOCATOR SEPARATION NETWORK", International Filing Date Nov. 2, 2012, published on May 23, 2013 as International Publication No. WO 2013/071825, which in turn claims priority from Chinese Patent Application No. 201110361760.1, filed Nov. 15, 2011, all of which are incorporated herein by reference in their entirety.

TECHNICAL FIELD

The present document relates to the mobile communication technology field, and in particular, to an identifier and locator separation network based on IPv6.

BACKGROUND OF THE RELATED ART

The industry has proposed many kinds of new mobility management technologies at present, and the essential idea is the subscriber identifier and locator separation technology. There is already a solution related to the Subscriber Identifier & Locator Separation Network (SILSN) in the related art, such as, realization based on the host such as the host identifier protocol (HIP) technology, and realization based on the network such as the locator and identifier separation (LISP) technology, and there are various associated technologies for supporting in each realization additionally. In these schemes, the Access Identifier (expressed as AID in this article) of terminal subscriber is not changed during the movement, and the Routing identifier (expressed as RID in this article) is assigned separately according to the terminal location to realize the routing and transmission of the data message.

FIG. 1 shows an architecture of an identifier and locator separation network (SILSN), using the realization based on the network. The network topology of the SILSN architecture is divided into the access network and the backbone network with the topology relation being not overlapped; the access network, which is responsible for the access of all terminals, is located at the edge of the backbone network, and the backbone network is responsible for the routing and transmission of the data message among the accessing terminals. In this network, the AID, as the subscriber identifier of the terminal, maintains unchanged all the time during the movement of the terminal; the RID is the Routing identifier assigned for the terminal by the network and used in the backbone network. It should be illustrated that there can be different names for different SILSN architectures, but the essences are the same.

In the SILSN architecture, the terminal can be one or more of a mobile terminal, a fixed terminal and a nomadic terminal, such as a mobile phone, a fixed telephone, a computer and a server, etc.

In the SILSN architecture, the access network is used for providing two-layer (the physical layer and the link layer) access means for the terminal, to maintain the physical access link between the terminal and the access service router (ASR).

In the SILSN architecture, the main network element of the backbone network includes the following elements:

An access service router (ASR) is an edge router of the backbone network, used for assigning an RID for a terminal, maintaining AID-RID mapping information of a terminal, registering and inquiring an AID-RID binding relation of a terminal at an identifier location register (ILR), and realizing routing and transmission of the data message, etc. The terminal must access to the backbone network through the ASR. The RID assigned for the terminal by the ASR includes address information of that ASR, or to say, pointing to that ASR. The ASR performs the tunnel encapsulation on the data message of the terminal by using the RID and RID of an opposite terminal after receiving the data message sent by the terminal, to send to the opposite terminal; and removes the RID tunnel encapsulation when receiving the data message sent to the terminal, and sends the data message to the terminal.

A common router (CR), is a core router of the backbone network, used for performing routing according to the RID in the data message, and transmitting the data message by taking the RID as the destination address.

The ILR is used for storing and maintaining the mapping information of the identifier and the Routing identifier of a home subscriber terminal, which is denoted as the AID-RID mapping information as well herein, processing the registration, deregistration and inquiry of the terminal location.

Alternatively, the backbone network can also include:

an internet service router (ISR), with an interface with the traditional IP network, the ASR and the ILR, used for realizing interconnection of an identifier and locator separation network and the traditional IP network.

It can be found that, in order to realize normal transmission of the message, the ASR needs to assign the RID for the terminal when the terminal is accessing, and needs to register the AID and RID binding of the subscriber at the ILR, to update the binding RID of the terminal in the ILR. In an example, the ASR maintains the information of the opposite terminal of the terminal (also can be called the connection information of the terminal and the communication opposite terminal, or the communication relation information of the terminal and the communication opposite terminal) for each terminal, including the corresponding relation information of the AID of the terminal and its communication opposite AID of the terminal, and also including the AID-RID mapping information of the terminal.

The identifier and locator separation network generally is designed to use the IP address as the identifier, for the transparent support of the application program and the terminal device, that is, what the socket of the application program is connected is still an IP address, and no change needs to be made. In fact, the meaning of the IP address is already not a routable IP address in common sense.

The identifier and locator separation network can solve a series of problems brought by the ambiguity of the IP address, but the access service router ASR needs to additionally use the RID to perform the tunnel encapsulation and decapsulation, and the tunnel encapsulation will increase the overhead of the backbone network.

SUMMARY OF THE INVENTION

A system and method for realizing an identifier and locator separation network based on IPv6 solves the additional overhead, brought by creating tunnels and removing tunnels, of the identifier and locator separation network realized based on the network.

The present document provides a method for realizing an identifier and locator separation network, comprising:

taking a network prefix assigned for a terminal as a part of an IPv6 address of the terminal, and also taking a subscriber Access Identifier (AID) assigned for the terminal as a part of the IPv6 address.

Preferably, the AID is part or all of later 64 bits of the IPv6 address.

Preferably, when the terminal is a terminal which can perform an access service router (ASR) switching, the network prefix is a fixed prefix; and when the terminal is a terminal which cannot perform the ASR switching, the network prefix is a fixed prefix or a Routing identifier (RID) assigned by the ASR.

Preferably, when an IPv6 address assigned for a source terminal is the RID of the terminal added with the AID of the terminal, the source IPv6 address used when the source terminal sends a data packet is the RID added with the AID of the terminal, and after receiving the data packet sent by the terminal, the ASR to which the source terminal belongs directly forwards the data packet to an internet service router (ISR) or an ASR to which a destination terminal belongs; and after receiving the data packet which is returned to the source terminal, the ASR to which the source terminal belongs directly forwards the data packet to the source terminal.

Preferably, when an IPv6 address assigned for a source terminal is the fixed prefix added with the AID of the terminal, the source IPv6 address used when the source terminal sends a data packet is the fixed prefix added with the AID of the terminal, and after receiving the data packet sent by the terminal, the ASR to which the source terminal belongs replaces the fixed prefix in the source IPv6 address with the RID and then forwards the data packet to the ISR or an ASR to which a destination terminal belongs; and after receiving the data packet which is returned to the source terminal, the ASR to which the source terminal belongs replaces the RID in the IPv6 address with the fixed prefix and then forwards the data packet to the source terminal.

Preferably, when the source terminal sending a data packet is the terminal which cannot perform the ASR switching, and when the ISR receives the data packet forwarded by the ASR to which the source terminal belongs to an application server, if the RID assigned for the source terminal by the ASR can be used for routing outside of the identifier and locator separation network, then the ISR forwards the data packet to the application server directly, or replaces the RID with the network prefix which can be used for routing outside of the identifier and locator and separation network and then forwards the data packet to the application server.

Preferably, when the source terminal sending a data packet is the terminal which cannot perform the ASR switching, if the RID assigned for the source terminal by the ASR cannot be used for routing outside of the identifier and locator separation network, after receiving the data packet forwarded by the ASR to which the source terminal belongs to the application server, the ISR replaces the RID with the network prefix which can be used for routing outside of the identifier and locator and separation network and then forwards the data packet to an application server.

Preferably, when the source terminal sending a data packet is the terminal which can perform the ASR switching, and when the ISR receives the data packet forwarded by the ASR to which the source terminal belongs to an application server, no matter whether the RID assigned for the source terminal by the ASR can be used for routing outside of the identifier and locator separation network, the ISR will replace the RID with the network prefix which can be used for routing and then forward the data packet to the application server.

Preferably, the fixed prefix is taken as part or all of former 64 bits of the IPv6 address.

The present document further provides a network side device for realizing an identifier and locator separation network, wherein, the network side device is configured to assign a network prefix and a subscriber access identifier (AID) for a terminal when the terminal registers; take the network prefix as a part of an IPv6 address assigned for the terminal, and also take the AID as a part of the IPv6 address assigned for the terminal.

Preferably, the network side device comprises an access service router (ASR) and an identifier location register (ILR);

the ASR is configured to obtain an identifier (AID) of the terminal from the ILR when the terminal registers; and the AID is part or all of later 64 bits of the IPv6 address.

Preferably, the ASR is further configured to assign a Routing identifier (RID) for the terminal;

when the terminal is a terminal which can perform an access service router (ASR) switching, a network prefix in the IPv6 is a fixed prefix; and when the terminal is a terminal which cannot perform the ASR switching, the network prefix is a fixed prefix or an RID assigned by the ASR.

Preferably, the network side device further comprises an internet service router (ISR);

an ASR to which a source terminal belongs is further configured to: when an IPv6 address assigned for the source terminal is the RID of the terminal added with the AID of the terminal, directly forward a data packet to the ISR or an ASR to which a destination terminal belongs; and the ASR to which the source terminal belongs is further configured to: after receiving the data packet which is returned to the source terminal, directly forward the data packet to the source terminal.

Preferably, the network side device further comprises an internet service router (ISR);

an ASR to which a source terminal belongs is further configured to: when an IPv6 address assigned for a source terminal is the fixed prefix added with the AID of the terminal, and the source IPv6 address of the data packet received by the ASR to which the source terminal belongs and sent by the source terminal is the fixed prefix added with the AID of the terminal, after receiving the data packet sent by the terminal, replace the fixed prefix in the source IPv6 address with the RID and then forward the data packet to the ISR or an ASR to which a destination terminal belongs; and the ASR to which the source terminal belongs is further configured to: after receiving the data packet which is returned to the source terminal, replace the RID in the IPv6 address with the fixed prefix and then forward the data packet to the source terminal.

Preferably, the network side device further comprises an internet service router (ISR); and the ISR is configured to:

when the source terminal sending a data packet is the terminal which cannot perform the ASR switching, and when the ISR receives the data packet forwarded by the ASR to which the source terminal belongs to an application server, if the RID assigned for the source terminal by the ASR can be used for routing outside of the identifier and locator separation network, then forward the data packet to the application server directly, or replace the RID with the network prefix which can be used for routing outside of the identifier and locator and separation network and then forward the data packet to the application server.

Preferably, the network side device further comprises an internet service router (ISR); and the ISR is further configured to:

when the source terminal sending a data packet is the terminal which cannot perform the ASR switching, if the RID assigned for the source terminal by the ASR cannot be used for routing outside of the identifier and locator separation network, replace the RID in the received data packet with the network prefix which can be used for routing outside of the identifier and locator and separation network and then forward the data packet to an application server.

Preferably, the ISR is further configured to:

when the source terminal sending a data packet performs the ASR switching, and when the ISR receives the data packet forwarded by the ASR to which the source terminal belongs to an application server, no matter whether the RID assigned for the source terminal by the ASR can be used for routing outside of the identifier and locator separation network, replace the RID with the network prefix which can be used for routing and then forward the data packet to the application server.

Preferably, the fixed prefix is taken as part or all of former 64 bits of the IPv6 address.

In conclusion, the embodiments of the present document provide a system and method for realizing an identifier and locator separation network based on IPv6, and the additional overhead brought by creating tunnel and removing tunnel can be saved.

PREFERRED EMBODIMENTS OF THE INVENTION

Figure 1:
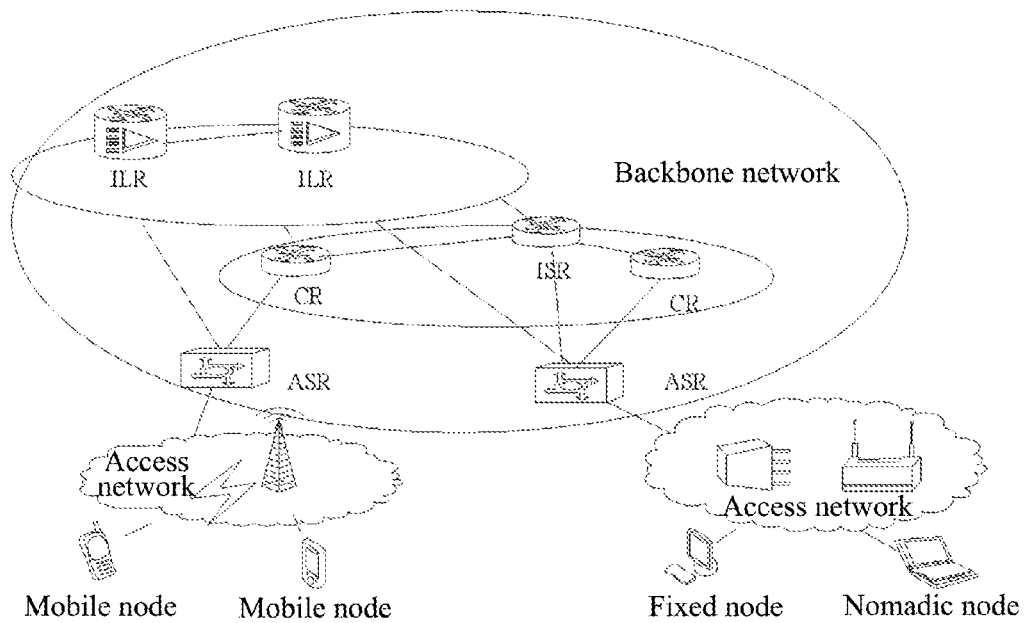
FIG. 1 is a diagram of an existing SILSN network architecture.

The embodiments of the present document are described in detail with reference to the accompanying drawings hereinafter. It should be illustrated that, in the case of not conflicting, the embodiments in the present application and features in these embodiments can be combined with each other.

The IPv6 is the abbreviation of Internet Protocol Version 6. The IPv6 is a next generation IP protocol designed by the Internet Engineering Task Force (IETF) and used for replacing the current edition IP protocol (IPv4). The version number of the current IP protocol is 4 (abbreviated as IPv4), and its next edition is IPv6.

The global IPv6 unicast address is made up of two logical parts: one 64-bit network prefix and one 64-bit interface ID. The former 64-bit network prefix is used to address the local area network to which the host belongs.

There are two kinds of address configuration modes for IPv6: Stateless Address Autoconfiguration and Stateful Address Autoconfiguration.

In the mode of the stateful address autoconfiguration, it mainly adopts the dynamic host configuration protocol (DHCP), and the network interface obtains the address configuration information from the DHCP server through the client/server mode. In the mode of stateless address autoconfiguration, the network interface receives the global address prefix declared by the router, and obtains a gatherable global unicast address in combination with the interface ID.

The embodiment of the present document provides a device and method for realizing an identifier and locator separation network based on the IPv6, wherein the network prefix assigned for a terminal is taken as a part of the IPv6 address of the terminal and the subscriber Access Identifier (AID) assigned for the terminal is also taken as a part of the IPv6 address.

Device Embodiment

The present embodiment provides a network side device for realizing an identifier and locator separation network, wherein, the network side device is configured to assign a network prefix and a subscriber access identifier (AID) for a terminal when the terminal registers; take the network prefix as a part of an IPv6 address assigned for the terminal, and also take the AID as a part of the IPv6 address assigned for the terminal.

The network side device includes an access service router (ASR) and an identifier location register (ILR);

the ASR is configured to obtain an AID of the terminal; and the AID is part or all of later 64 bits of the IPv6 address.

Furthermore, the ASR is further configured to assign a Routing identifier (RID) for the terminal;

when the terminal is a terminal which can perform an access service router (ASR) switching, a network prefix in the IPv6 is a fixed prefix; and when the terminal is a terminal which cannot perform the ASR switching, the network prefix is a fixed prefix or an RID assigned by the ASR.

Furthermore, the network side device further includes an internet service router (ISR);

when an IPv6 address assigned for the source terminal is the RID of the terminal added with the AID of the terminal, the ASR to which the source terminal belongs directly forwards a data packet to the ISR or an ASR to which a destination terminal belongs; and the ASR to which the source terminal belongs is further configured to: directly forward the data packet to the source terminal after receiving the data packet which is returned to the source terminal.

Furthermore, when an IPv6 address assigned for a source terminal is the fixed prefix added with the AID of the terminal, the source IPv6 address of the data packet received by the ASR to which the source terminal belongs and sent by the source terminal is the fixed prefix added with the AID of the terminal, and the ASR to which the source terminal belongs replaces the fixed prefix in the source IPv6 address with the RID and then forwards the data packet to the ISR or an ASR to which a destination terminal belongs after receiving the data packet sent by the terminal; and the ASR to which the source terminal belongs is further configured to replace the RID in the IPv6 address with the fixed prefix and then forward the data packet to the source terminal after receiving the data packet which is returned to the source terminal.

Furthermore, when the source terminal sending a data packet is the terminal which cannot perform the ASR switching, and when the ISR receives the data packet forwarded by the ASR to which the source terminal belongs to an application server, if the RID assigned for the source terminal by the ASR can be used for routing outside of the identifier and locator separation network, then the ISR forwards the data packet to the application server directly, or replaces the RID with the network prefix which can be used for routing outside of the identifier and locator and separation network and then forwards the data packet to the application server;

if the RID assigned for the source terminal by the ASR cannot be used for routing outside of the identifier and locator separation network, the ISR is further configured to replace the RID in the received data packet with the network prefix which can be used for routing outside of the identifier and locator and separation network and then forward the data packet to an application server.

Furthermore, when the source terminal sending a data packet performs the ASR switching, and when the ISR receives the data packet forwarded by the ASR to which the source terminal belongs to an application server, no matter whether the RID assigned for the source terminal by the ASR can be used for routing outside of the identifier and locator separation network, the ISR replaces the RID with the network prefix which can be used for routing and then forwards the data packet to the application server.

Furthermore, the fixed prefix is taken as part or all of former 64 bits of the IPv6 address.

Method Embodiment

The realization in the identifier and locator separation network (SILSN) is illustrated by using the embodiment hereinafter. It needs to illustrate that the procedure of the present document can also be extensively suitable for other identifier and locator separation architecture.

Embodiment One

Figure 2:
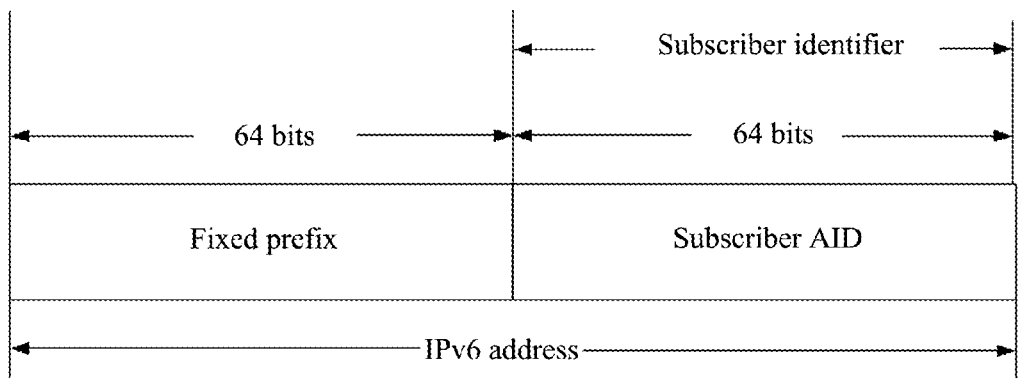
FIG. 2 is a diagram of an IPv6 address assigned for a terminal according to an embodiment of the present document.
Figure 6:
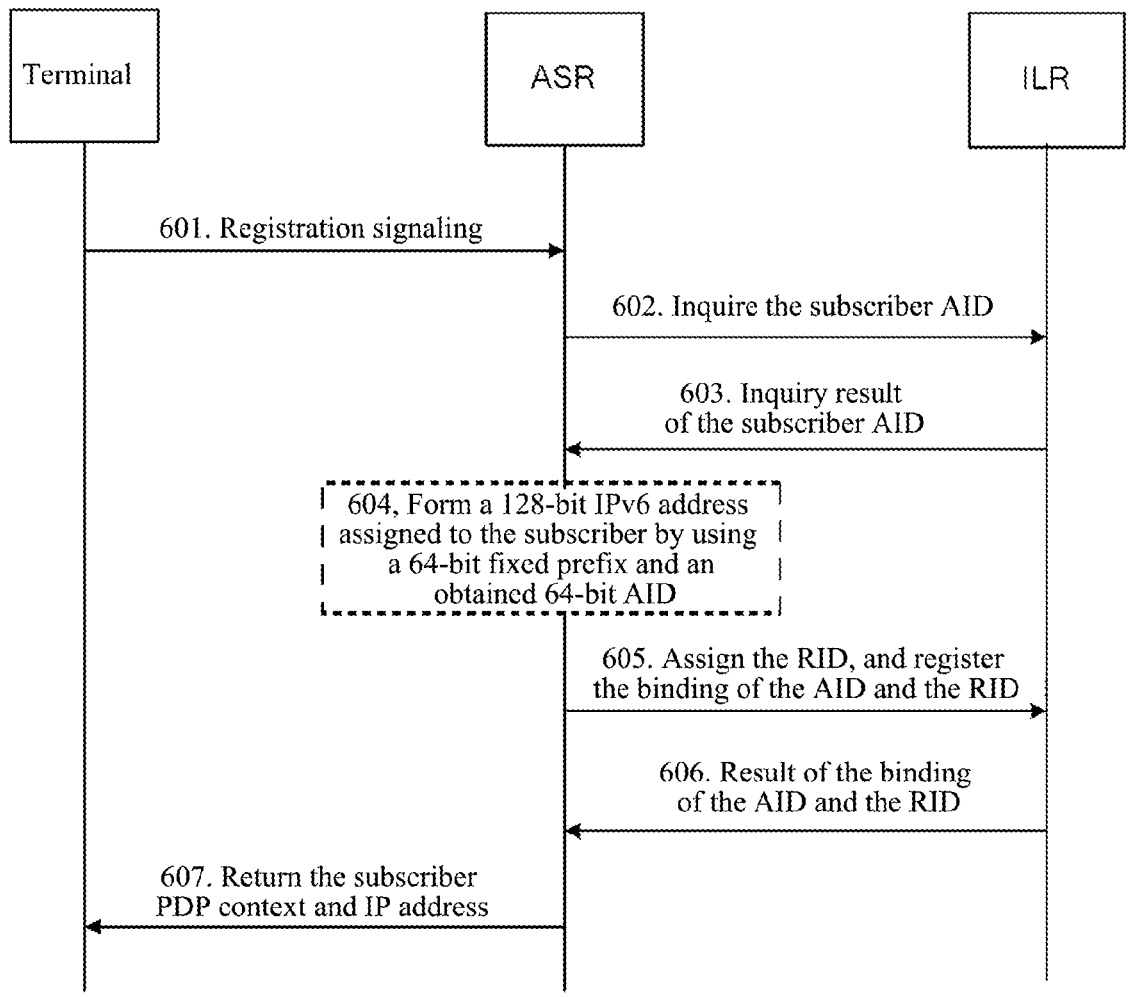
FIG. 6 is an embodiment of a terminal of an identifier and locator separation network terminal registering with a network according to the present document.

The present embodiment is based on the SILSN identifier and locator separation network architecture described in FIG. 1, and FIG. 6 shows a procedure of a terminal registering with the SILSN network, and this process includes the following steps:

in step 601, a registration signaling of the terminal is sent to the ASR;

in step 602, the ASR inquires the ILR according to the terminal IMSI, to obtain the 64-bit AID of the terminal;

in step 603, the ILR returns the subscriber AID back to the ASR;

in step 604, the ASR assigns its routable network prefix (RID) for the subscriber;

in step 605, the ASR registers the binding of the AID and the RID of the subscriber with the ILR;

in step 606, the ILR returns a binding result of the AID and the RID to the ASR;

in step 607, the ASR returns the subscriber PDP context and 128-bit IPv6 address to the terminal, takes the network prefix assigned for the terminal as a part of the IPv6 address of the terminal, and also takes the subscriber Access Identifier (AID) assigned for the terminal as a part of the IPv6 address;

when the terminal can perform the ASR switching, the former 64-bit network prefix is a fixed prefix, the AID is part or all of the later 64 bits of the IPv6 address, as shown in FIG. 2; when the terminal cannot perform the ASR switching, the former 64-bit network prefix can be the RID assigned by the ASR, and also can be a fixed prefix, and the AID is part or all of the later 64 bits of the IPv6 address;

furthermore, in step 602, the RID information can be carried at the same time, which is used for the ILR to register the binding of the AID and the RID, and then step 605 and step 606 can be omitted.

Embodiment Two

Figure 5:
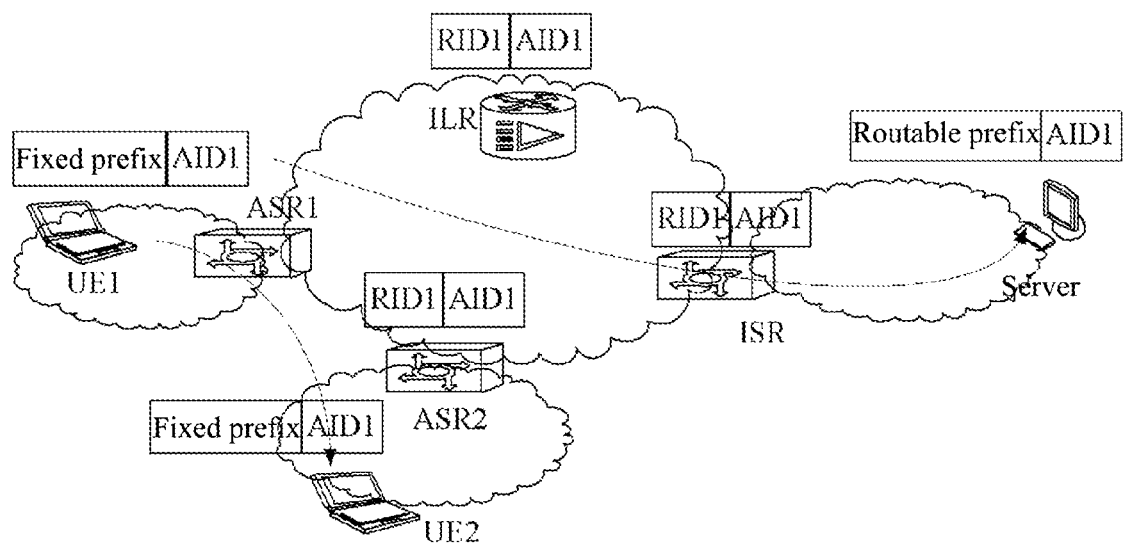
FIG. 5 is a diagram of transmitting data packets in a network according to an embodiment of the present document.
Figure 7:
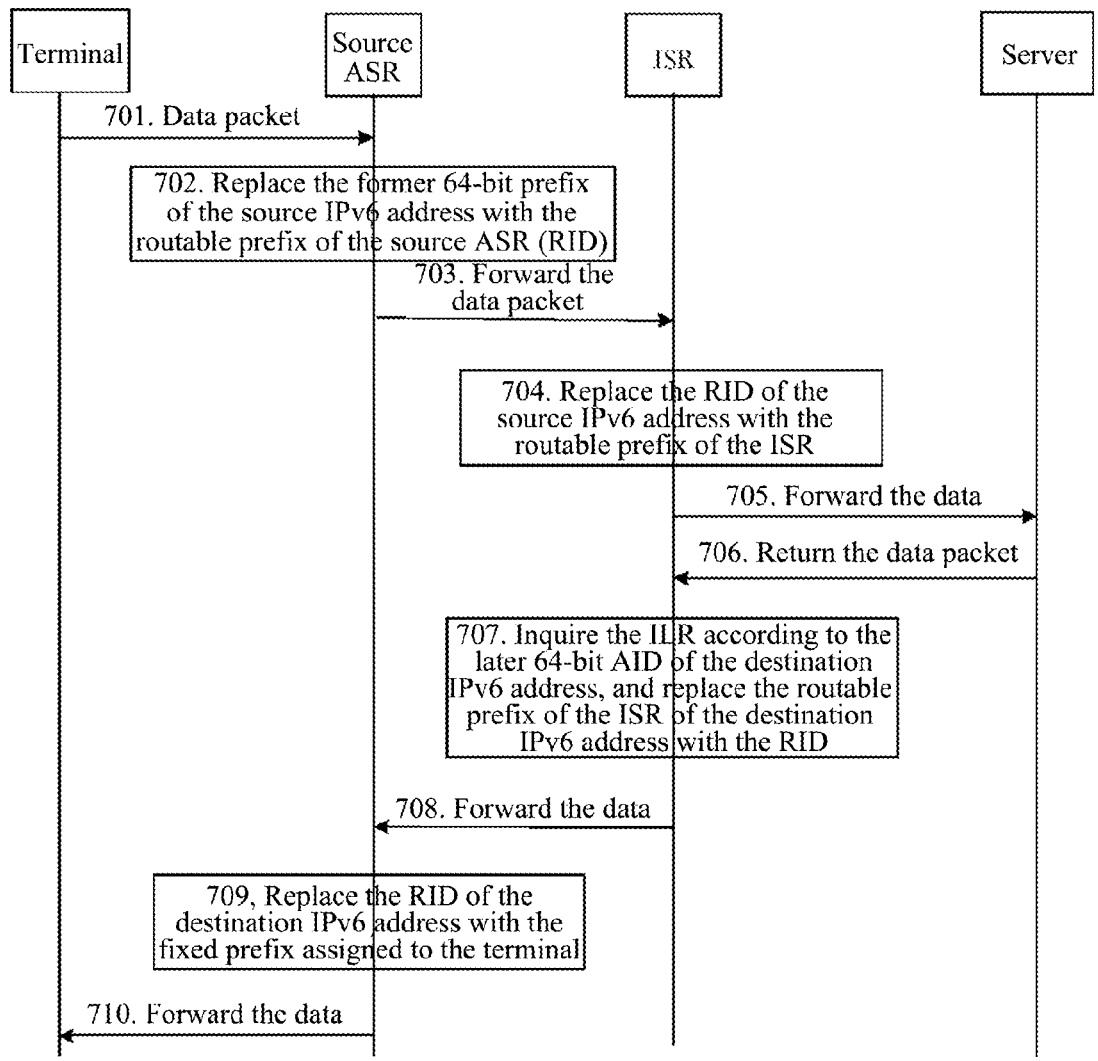
FIG. 7 is an embodiment of a terminal of an identifier and locator separation network sending data to a traditional internet server according to the present document.

The present embodiment is based on the SILSN identifier and locator separation network architecture described in FIG. 1. FIG. 5 shows a flow direction diagram of the data flow sent by the terminal, and FIG. 7 shows a processing procedure of the terminal sending the data message to the traditional Internet.

In step 701, the terminal sends the data message to the ASR, the source IPv6 address is the IPv6 address assigned for it by the ASR, the destination IPv6 address is the IPv6 address of the server in the traditional Internet;

when the terminal cannot perform the ASR switching, the IPv6 address assigned for it by the ASR is the RID added with the AID of the terminal, and the IPv6 address can be the 64-bit fixed prefix added with the AID of the terminal as well;

when the terminal can perform the ASR switching, the IPv6 address assigned for it by the ASR is the 64-bit fixed prefix added with the AID of the terminal.

Figure 3:
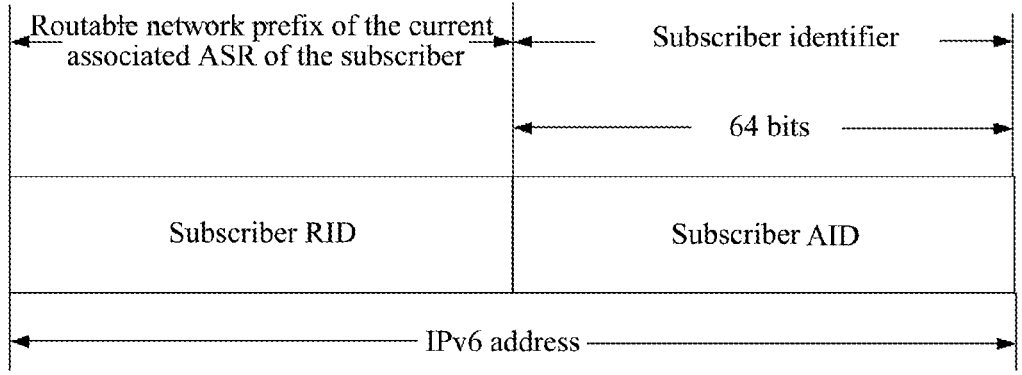
FIG. 3 is a diagram of an IPv6 address for transmitting data in a backbone network through an ASR according to an embodiment of the present document.

In step 702, if the IPv6 address is the RID added with the AID of the terminal, then the source ASR forwards the data packet to the ISR directly;

if the IPv6 address is the 64-bit fixed prefix added with the AID of the terminal, then the source ASR replaces the former 64-bit fixed prefix in the source IPv6 address of the data message with the RID, as shown in FIG. 3, and then forwards the data packet.

In step 703, the data packet is routed to the ISR.

Figure 4:
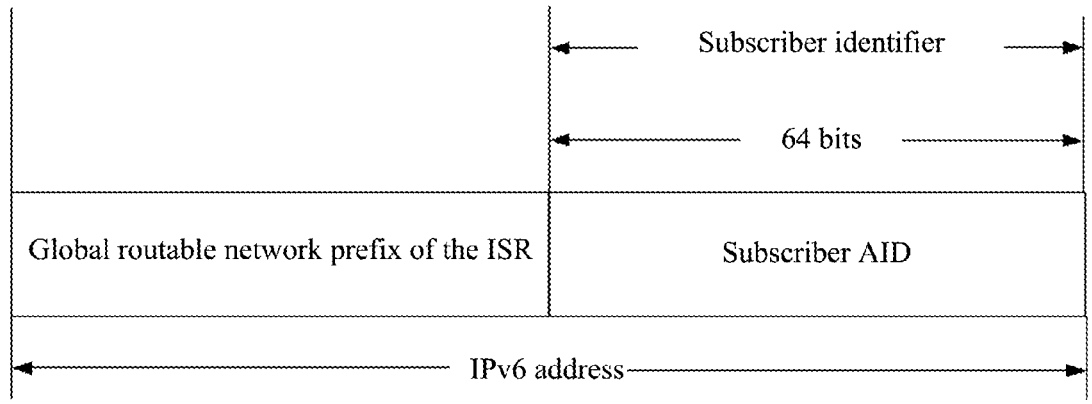
FIG. 4 is a diagram of an IPv6 address for sending data to a traditional internet through an ISR according to an embodiment of the present document.

In step 704, if the RID is a network prefix which cannot be used for routing in the traditional Internet, then the ISR replaces the RID in the source IPv6 address in the data packet with its unchanged routable network prefix in the traditional Internet, as shown in FIG. 4;

when the terminal is the terminal which cannot perform the ASR switching and the RID is the routable network prefix in the traditional Internet, then the ISR may not replace the network prefix (certainly, it can also replace the RID with the routable network prefix in the traditional Internet).

In step 705, the ISR sends the data packet to the destination server, the source IPv6 address is the ISR routable network prefix added with the 64-bit AID, or the RID added with the 64-bit AID (when the RID can be used for routing), and the destination IPv6 address is an IPv6 address of a destination server.

In step 706, the destination server returns the data packet to the terminal, the source IPv6 address is the IPv6 address of the server, the destination IPv6 address is the ISR routable network prefix added with the AID of the terminal, or the destination IPv6 address is the RID added with the 64-bit AID (when the RID can be used for routing); the destination server returns the data packet back to the ISR.

In step 707, if the destination IPv6 address is the RID added with the 64-bit AID, then the ISR does not perform the replacement of the network prefix;

if the destination IPv6 address is the ISR routable network prefix added with the AID of the terminal, then the ISR inquires the mapping server ILR according to the AID of the destination IPv6 address, to obtain the RID corresponding to the AID of the current terminal and replace the ISR routable network prefix of the destination IPv6 address with the RID.

In step 708, the ISR forwards the data packet to the ASR.

In step 709, the data are routed to the ASR to which the terminal belongs; if the IPv6 address assigned for the terminal is the RID added with the AID of the terminal, that is, when the source IPv6 address of the data packet received by the ASR in step 702 is the RID added with the AID of the terminal, the ASR does not need to perform the switching of the network prefix;

if the IPv6 address assigned for the terminal is the fixed prefix added with the AID of the terminal, that is, when the source IPv6 address of the data packet received by the ASR in step 702 is the fixed prefix added with the AID of the terminal, the ASR replaces the RID of the destination IPv6 address (that is, the former 64-bit network prefix) with the fixed prefix of the IPv6 address of the terminal according to the AID of the terminal in the destination IPv6 address.

In step 710, the ASR forwards the data packet to the terminal.

In the situation that the ASR does not replace the prefix, only the terminal moves and does not perform the ASR switching, that is, the ASR is an anchor point. At this moment, the ASR can form the IPv6 address by taking its own RID as the network prefix together with the AID to be used for sending to the terminal. Because the terminal does not perform the ASR switching, this IPv6 address will not change, which can guarantee the service continuity. If the RID is a global routable address, then the ISR does not need to replace the RID with the routable prefix, which is related to the deployment.

Embodiment Three

Figure 8:
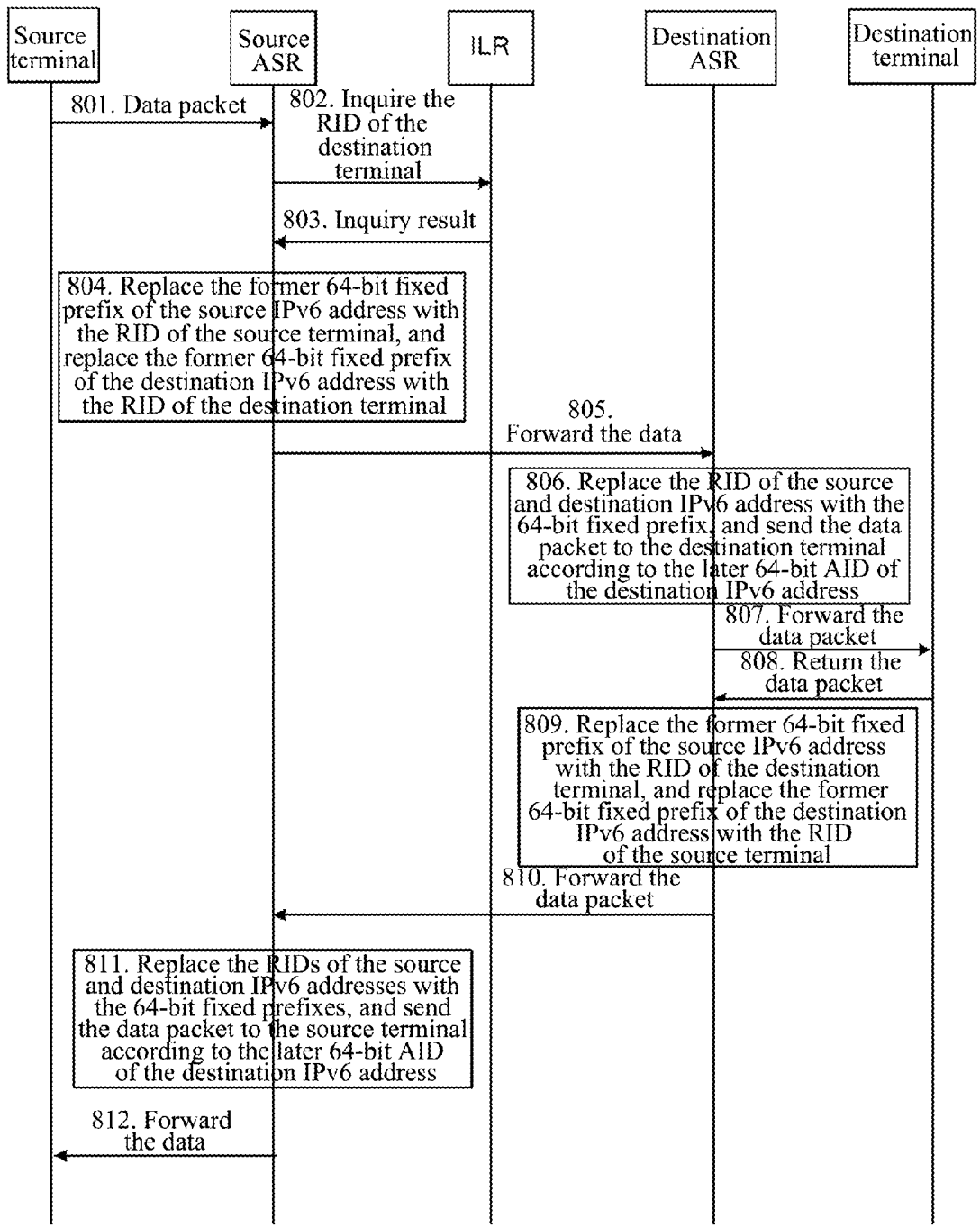
FIG. 8 is an embodiment of terminals communicating with each other in an identifier and locator separation network according to the present document.

The present embodiment is based on the SILSN identifier and locator separation network architecture described in FIG. 1. FIG. 5 shows a flow direction diagram of the data flow sent by the terminal, and FIG. 8 shows a processing procedure of a terminal sending the data message to another terminal.

In step 801, the source terminal sends the data message to the ASR, the source IPv6 address is the IPv6 address assigned for it by the ASR, and the destination IPv6 address is the IPv6 address of the destination terminal.

In the present embodiment, it is supposed that the IPv6 addresses assigned for the source terminal and the destination terminal are all the fixed prefix added with the AID of the terminal In step 802, the source ASR inquires and obtains the RID of the destination terminal from the ILR according to the later 64 bits of the of the destination IPv6 address (that is, the AID).

In step 803, the ILR sends the RID of the destination terminal to the source ASR.

In step 804, the source ASR replaces the former 64-bit fixed prefix in the source IPv6 address with the RID of the source terminal, and replaces the 64-bit fixed prefix in the destination IPv6 address with the RID of the destination terminal.

In step 805, the source ASR forwards the data, and the data packet is routed to the destination ASR.

In step 806, the destination ASR replaces the RID of the source terminal in the source IPv6 address with the fixed prefix of the source terminal, and replaces the RID of the destination terminal in the destination IPv6 address with the fixed prefix of the destination terminal; the fixed prefix of the source terminal and the fixed prefix of the destination terminal can be same and also can be different.

In step 807, the destination ASR sends the data message to the destination terminal according to the later 64-bit AID of the destination IPv6 address.

In step 808, the destination terminal returns an acknowledgement data packet, the source IPv6 address is the 64-bit fixed prefix added with the AID of the destination terminal, and the destination IPv6 address is the 64-bit fixed prefix added with the AID of the source terminal.

In step 809, according to the later 64-bit AID of the source terminal of the destination IPv6 address, the destination ASR replaces the former 64-bit fixed prefix of the destination IPv6 address with the RID of the source terminal, and replaces the former 64-bit fixed prefix of the source IPv6 address with the RID of the destination terminal.

In step 810, the data packet is routed to the source ASR.

In step 811, the source ASR replaces the RID in the source IPv6 address with the fixed prefix of the source terminal, and replaces the RID of the destination IPv6 address with the fixed prefix of the destination terminal.

In step 812, the source ASR forwards the data packet to the source terminal according to the AID of the source terminal in the destination IPv6 address.

Furthermore, when the source terminal is a terminal which cannot perform the ASR switching, the IPv6 address assigned for the source terminal in embodiment one also can be the RID of the source terminal added with the AID of the source terminal, in this way, the source IPv6 address of the data packet sent by the source terminal is the RID of the source terminal added with the AID of the source terminal; the ASR does not need to perform the replacement of the network prefix and forwards the data packet to the ASR of the destination end directly after receiving the data packet sent by the terminal, and the ASR of the source terminal also does not need to perform the replacement of the network prefix and return the data packet back to the source terminal directly after receiving the data packet which is returned to the source terminal;

when the destination terminal is a terminal which cannot perform the ASR switching, the IPv6 address assigned for the destination terminal also can be the RID of the destination terminal added with the AID of the destination terminal; the destination IPv6 address of the data packet sent to the destination terminal and received by the ASR of the destination end is the RID of the destination terminal added with the AID of the destination terminal, in this way, the ASR of the destination end forwards the data packet to the destination terminal directly; similar, the ASR of the destination end does not need to perform the replacement of the network prefix and forwards the data packet to the ASR of the source terminal directly after receiving the data packet returned by the destination terminal.

Embodiment Four

Figure 9:
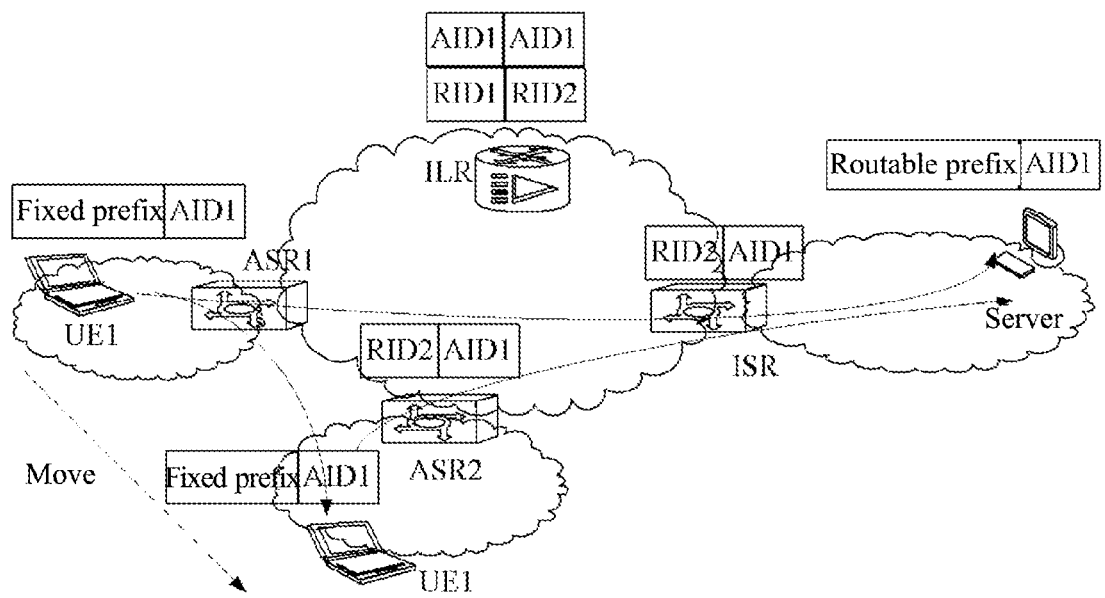
FIG. 9 is a diagram of data flow after a terminal performs an ASR switching in an identifier and locator separation network according to an embodiment of the present document.
Figure 10:
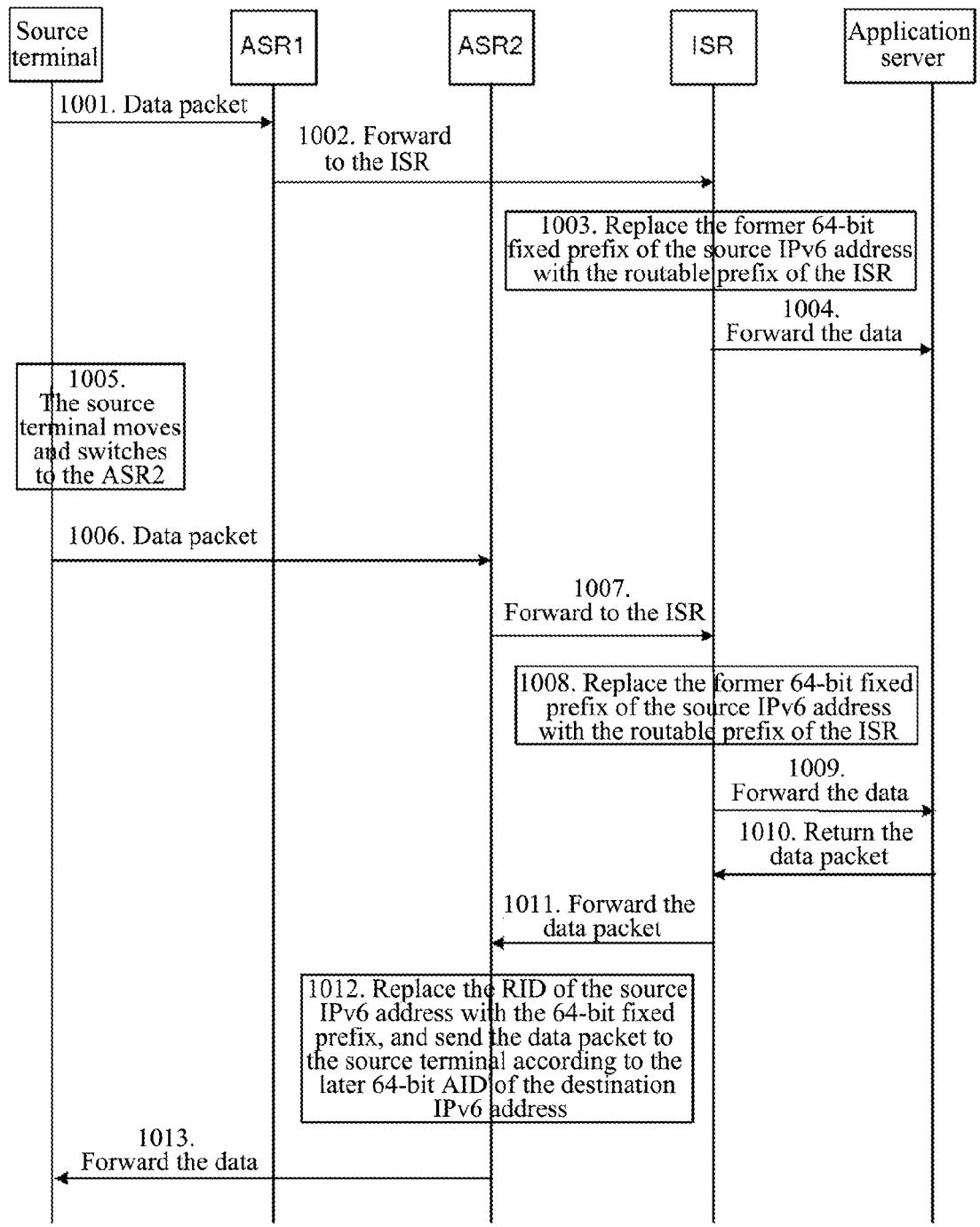
FIG. 10 is an embodiment that service is not interrupted after a terminal performs an ASR switching in an identifier and locator separation network according to the present document.

The present embodiment is based on the SILSN identifier and locator separation network architecture described in FIG. 1. FIG. 9 shows a flow direction diagram of the data before and after the terminal performs the ASR switching, and FIG.

10 shows a procedure of the uninterrupted service when a terminal moves and performs the ASR switching.

In step 1001, the source terminal sends the data message to the ASR1, the source IPv6 address is the IPv6 address assigned for it by the ASR1, and the destination IPv6 address is the IPv6 address of the application server.

In step 1002, the ASR1 replaces the former 64-bit fixed prefix of the source IPv6 address with the RID1 of the source terminal, and forwards the data to the ISR.

In step 1003, the ISR replaces the RID of the source IPv6 address with the ISR routable prefix.

In step 1004, the ISR forwards the data to the application server.

In step 1005, the source terminal switches to the ASR2, and the ASR2 or the ASR1 sends the signaling, and updates the binding of the AID of the source terminal and the RID1 assigned by the ASR1 in the ILR to the binding of the AID of the source terminal and the RID2 assigned by the ASR2.

In step 1006, the source terminal sends the data packet to the ASR2, the source IPv6 address is the 64-bit fixed prefix of the ASR2 added with the AID, and the destination IPv6 address is the IPv6 address of the application server.

In step 1007, the ASR2 replaces the former 64-bit fixed prefix of the source IPv6 address with the RID2 of the source terminal, and forwards the data to the ISR.

In step 1008, the ISR replaces the RID2 of the source IPv6 address with the ISR routable prefix; meanwhile, the ISR can study the binding of the AID of the source terminal and the RID2.

In step 1009, the ISR forwards the data packet to the application server; the source IPv6 address of the data packet received by the application server is the routable network prefix added with the AID of the terminal all the time, which keeps the service continuity.

In step 1010, the data packet returned by the application server is routed to the ISR.

In step 1011, the ISR replaces the ISR routable prefix of the destination IPv6 address with the RID2.

In step 1012, the data packet is routed to the ASR2, and the ASR2 replaces the RID2 of the destination IPv6 address with the 64-bit fixed prefix.

In step 1013, the ASR2 forwards the data packet to the source terminal according to the later 64-bit AID of the source terminal of the destination IPv6 address. What the source terminal receives are still the same source and destination IPv6 addresses when it is associated with the ASR1, which keeps the service continuity.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of a combination of the hardware and software.

The above-mentioned embodiments are only used to illustrate the technical scheme of the present document while not to limit, and the present document is described in details only referring to the preferable embodiments. Those skilled in the art should understand that they can make modifications and equivalents according to the technical scheme of the present document without departing from the spirit and scope of the present document, which should be embodied in the scope of the appended claims of the present document.

INDUSTRIAL APPLICABILITY

The embodiment of the present document provides a system and realization method for identifier and locator separation network based on IPv6, and the additional overhead brought by creating tunnel and removing tunnel can be saved.

What I claim is:

1. A method for realizing an identifier and locator separation network, comprising:
   assigning a network prefix and an Access Identifier (AID) for a terminal when the terminal registers;
   assigning an IPv6 address for the terminal, wherein the network prefix assigned for the terminal is configured as a part of the IPv6 address, and the AID assigned for the terminal is configured as a part of the IPv6 address;
   when the terminal is a terminal which can perform an access service router (ASR) switching, the network prefix is configured as a fixed prefix;
   when the terminal is a terminal which cannot perform the ASR switching, the network prefix is configured as a fixed prefix or a Routing identifier (RID) assigned by the ASR;
   when an IPv6 address assigned for a source terminal is the RID of the terminal added with the AID of the terminal, the source IPv6 address used when the source terminal sends a data packet is configured as the RID added with the AID of the terminal;
   after receiving the data packet sent by the terminal, the ASR to which the source terminal belongs directly forwards the data packet to an internet service router (ISR) or an ASR to which a destination terminal belongs; and
   after receiving the data packet which is returned to the source terminal, the ASR to which the source terminal belongs directly forwards the data packet to the source terminal;
   when an IPv6 address assigned for a source terminal is the fixed prefix added with the AID of the terminal, the source IPv6 address used when the source terminal sends a data packet is configured as the fixed prefix added with the AID of the terminal;
   after receiving the data packet sent by the terminal, the ASR to which the source terminal belongs replaces the fixed prefix in the source IPv6 address with the RID and then forwards the data packet to the ISR or an ASR to which a destination terminal belongs; and
   after receiving the data packet which is returned to the source terminal, the ASR to which the source terminal belongs replaces the RID in the IPv6 address with the fixed prefix and then forwards the data packet to the source terminal.

2. The method according to claim 1, wherein,
   the AID is configured as part or all of later 64 bits of the IPv6 address.

3. The method according to claim 1, wherein,
   when the source terminal sending a data packet is the terminal which cannot perform the ASR switching, and when the ISR receives the data packet forwarded by the ASR to which the source terminal belongs to an application server, if the RID assigned for the source terminal by the ASR can be used for routing outside of the identifier and locator separation network, then the ISR forwards the data packet to the application server directly, or replaces the RID with the network prefix which can be used for routing outside of the identifier and locator and separation network and then forwards the data packet to the application server.

4. The method according to claim 1, wherein,
when the source terminal sending a data packet is the terminal which cannot perform the ASR switching, if the RID assigned for the source terminal by the ASR cannot be used for routing outside of the identifier and locator separation network, after receiving the data packet forwarded by the ASR to which the source terminal belongs to the application server, the ISR replaces the RID with the network prefix which can be used for routing outside of the identifier and locator and separation network and then forwards the data packet to an application server.

5. The method according to claim 1, wherein,
when the source terminal sending a data packet is the terminal which can perform the ASR switching, and when the ISR receives the data packet forwarded by the ASR to which the source terminal belongs to an application server, no matter whether the RID assigned for the source terminal by the ASR can be used for routing outside of the identifier and locator separation network, the ISR will replace the RID with the network prefix which can be used for routing and then forward the data packet to the application server.

6. The method according to claim 1, wherein,
the fixed prefix is configured as part or all of former 64 bits of the IPv6 address.

7. A network side device for realizing an identifier and locator separation network, wherein,
the network side device is configured to assign a network prefix and an AID for a terminal when the terminal registers; configure the network prefix as a part of an IPv6 address assigned for the terminal, and also configure the AID as a part of the IPv6 address assigned for the terminal;
the network side device comprises an ASR, an identifier location register (ILR) and an ISR,
wherein the ASR is configured to obtain the AID of the terminal from the ILR when the terminal registers;
the ASR is further configured to assign a Routing identifier (RID) for the terminal;
when the terminal is a terminal which can perform an ASR switching, a network prefix in the IPv6 is configured as a fixed prefix;
when the terminal is a terminal which cannot perform the ASR switching, the network prefix is configured as a fixed prefix or an RID assigned by the ASR;
an ASR to which a source terminal belongs is configured to do one of the following:
when an IPv6 address assigned for the source terminal is configured as the RID of the terminal added with the AID of the terminal, directly forward a data packet to the ISR or an ASR to which a destination terminal belongs; after receiving the data packet which is returned to the source terminal, directly forward the data packet to the source terminal; or when an IPv6 address assigned for the source terminal is configured as the fixed prefix added with the AID of the terminal, the source IPv6 address of the data packet received by the ASR to which the source terminal belongs and sent by the source terminal is configured as the fixed prefix added with the AID of the terminal, after receiving the data packet sent by the terminal, replace the fixed prefix in the source IPv6 address with the RID and then forwards the data packet to the ISR or an ASR to which a destination terminal belongs; after receiving the data packet which is returned to the source terminal, replace the RID in the IPv6 address with the fixed prefix and then forward the data packet to the source terminal.

8. The network side device according to claim 7, wherein, the AID is part or all of later 64 bits of the IPv6 address.

9. The network side device according to claim 7, wherein when the source terminal sending a data packet is the terminal which cannot perform the ASR switching, and when the ISR receives the data packet forwarded by the ASR to which the source terminal belongs to an application server, if the RID assigned for the source terminal by the ASR can be used for routing outside of the identifier and locator separation network, forward the data packet to the application server directly, or replace the RID with the network prefix which can be used for routing outside of the identifier and locator and separation network and then forward the data packet to the application server.

10. The network side device according to claim 7, wherein the ISR is further configured to:
when the source terminal sending a data packet is the terminal which cannot perform the ASR switching, if the RID assigned for the source terminal by the ASR cannot be used for routing outside of the identifier and locator separation network, replace the RID in the received data packet with the network prefix which can be used for routing outside of the identifier and locator and separation network and then forward the data packet to an application server.

11. The network side device according to claim 7, wherein, the ISR is further configured to:
when the source terminal sending a data packet performs the ASR switching, and when the ISR receives the data packet forwarded by the ASR to which the source terminal belongs to an application server, no matter whether the RID assigned for the source terminal by the ASR can be used for routing outside of the identifier and locator separation network, replace the RID with the network prefix which can be used for routing and then forward the data packet to the application server.

12. The network side device according to claim 7, wherein, the fixed prefix is configured as part or all of former 64 bits of the IPv6 address.

* * * * *